(12) United States Patent
Reitze et al.

(10) Patent No.: US 6,561,684 B2
(45) Date of Patent: May 13, 2003

(54) CAR SEAT WITH INTEGRATED SIDE LIGHT

(75) Inventors: Achim Reitze, Kassel (DE); Olaf Sackers, Langenmosen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 1 day.

(21) Appl. No.: 09/725,072

(22) Filed: Nov. 29, 2000

(65) Prior Publication Data

US 2001/0002169 A1 May 31, 2001

(30) Foreign Application Priority Data

Nov. 29, 1999 (DE) .......................... 199 57 449

(51) Int. Cl.⁷ .................................. B60Q 1/00
(52) U.S. Cl. .................. 362/488; 362/483; 315/84
(58) Field of Search ................... 362/488, 483, 362/131; 315/84

(56) References Cited

U.S. PATENT DOCUMENTS

| | | | | |
|---|---|---|---|---|
| 2,635,681 A | * | 4/1953 | Hiltman et al. | 297/217.6 |
| 4,217,628 A | * | 8/1980 | Windom | 362/483 |
| 4,823,239 A | * | 4/1989 | Doty | 362/481 |
| 5,149,186 A | * | 9/1992 | Matsuno et al. | 362/131 |
| 5,151,850 A | * | 9/1992 | Matsuno et al. | 362/488 |
| 5,206,562 A | * | 4/1993 | Matsuno et al. | 315/77 |
| 5,254,907 A | * | 10/1993 | Matsuno et al. | 315/77 |
| 5,709,448 A | * | 1/1998 | Jennings et al. | 362/581 |
| 6,000,822 A | * | 12/1999 | Polizzi et al. | 362/488 |
| 6,116,748 A | * | 9/2000 | George | 362/145 |

* cited by examiner

Primary Examiner—Sandra O'Shea
Assistant Examiner—Ronald E. DelGizzi
(74) Attorney, Agent, or Firm—Connolly Bove Lodge & Hutz LLP

(57) ABSTRACT

Lighting is provided for the entry area on the outer side of a seat part in the backrest of a car seat, which is provided with a seat part. The lighting can be switched on by opening the car door next to it. Current supplying lines are deployed through a line feeder leading to the car seat.

3 Claims, 1 Drawing Sheet

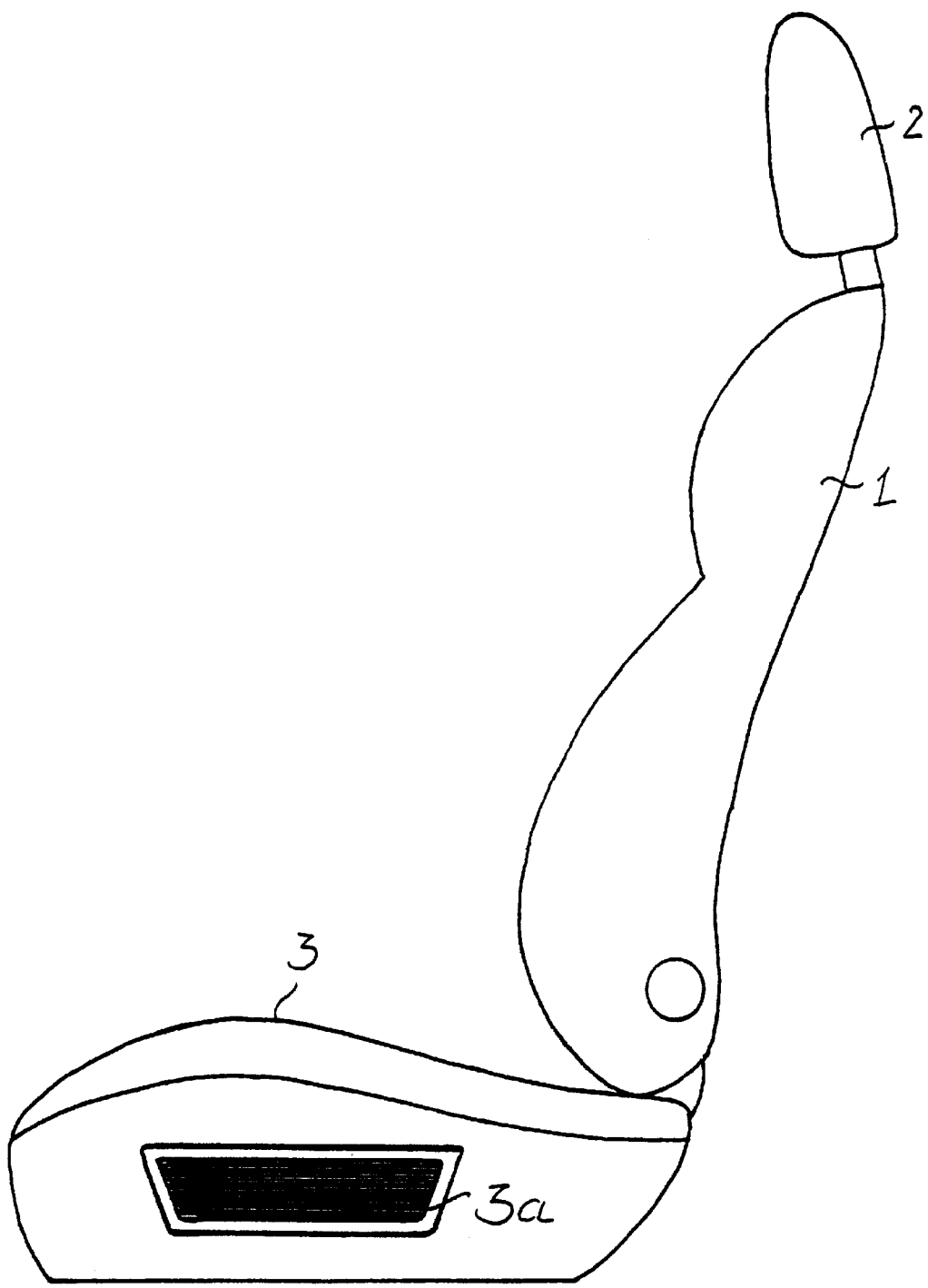

CAR SEAT WITH INTEGRATED SIDE LIGHT

FIELD OF THE INVENTION

The invention relates to a car seat having a seat part and a backrest. Lighting is arranged on the outer side of the seat part, located in the entry area.

BACKGROUND OF THE INVENTION

It is known that the entrance and exit area of a car can be illuminated with one or a plurality of lights arranged in the area of the body of the automobile. This can be achieved with inner area lighting and with a light-emitting unit mounted in each door. The inner area lighting and respective light emitting units are turned on when a door is opened. A disadvantage of the mounting of the lights in the area of body of the automobile is that the lights must be built in already during the assembly of the car and the connecting lines required for each light must be also deployed. Although the deployment of a light in the door results in a good illumination of the entry and exit area, the current must be in this case supplied through connected car body parts, which are movable with respect to each other.

SUMMARY OF THE INVENTION

Based on this status of prior art, the task of this invention is to provide a lighting arrangement which makes it possible to provide good illumination of the entrance area without requiring mobile current supply lines, and which is not dependant on the car body assembly.

The solution of this task is provided in accordance with the characteristics disclosed in patent claim 1.

Thanks to the arrangement of the lighting in the seat part, the light source is located in the immediate vicinity of the entry and exit area, which means that good illumination is guaranteed even with weak light sources. Since car seats are nowadays often equipped with motor-driven seat adjusting devices, an electric connection is provided in such cases for each seat. Thus, the lighting only needs to be connected to this connecting line. The decision about lighting to be deployed in the entry and exit area can thus be made only when the car seat is built into the construction.

BRIEF DESCRIPTION OF THE DRAWING

Preferred embodiments of the invention will be further described in reference to the FIGURE, which represents a schematic profile view of a car seat.

DETAILED DESCRIPTION OF THE INVENTION

Referring now to the FIGURE, a car seat is equipped with head support 2, provided on backrest 1, which is pivoted to seat part 3 so that it is rotatable. Lighting 3a is arranged on the outer side of seat part 3. The lighting can be deployed so that it is flush mounted on the side level of seat part 3. Lighting 3a can be constructed as an opening for light, which is aimed through its segments outward and downward. Due to the arrangement of lighting 3a in seat part 3, the lighting can be built into the construction at a height that is suitable for the best possible illumination of the doorstep and of the area in front of it. Switching of lighting 3a on and off is accomplished with a door contact provided in the neighboring door.

What is claimed is:

1. An automobile seat provided with a seat part and a back rest comprising a lighting unit embedded in the seat part on an outer side of the seat part facing an entry area, wherein light from the lighting unit is directed at a doorstep located below the automobile door and at a floor area located outside the automobile door.

2. The automobile seat according to claim 1, wherein the lighting unit is switched by opening a automobile door to the entry area, wherein a number of current supplying lines are deployed through an electric line feeder leading to the seat.

3. The automobile seat according to claim 2, wherein the line feeder is provided with a plug connection between an automobile body and the seat.

* * * * *